US008660351B2

(12) United States Patent
Tang (10) Patent No.: US 8,660,351 B2
(45) Date of Patent: Feb. 25, 2014

(54) AUTO-CROPPING IMAGES USING SALIENCY MAPS

(75) Inventor: Hao Tang, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 84 days.

(21) Appl. No.: 13/279,961

(22) Filed: Oct. 24, 2011

(65) Prior Publication Data

US 2013/0101210 A1  Apr. 25, 2013

(51) Int. Cl.
*G06K 9/34* (2006.01)
(52) U.S. Cl.
USPC ........................................................ 382/173
(58) Field of Classification Search
None
See application file for complete search history.

(56) References Cited

U.S. PATENT DOCUMENTS

| | | | |
|---|---|---|---|
| 6,654,506 B1 * | 11/2003 | Luo et al. | 382/282 |
| 7,151,547 B2 | 12/2006 | Lin et al. | |
| 7,760,956 B2 | 7/2010 | Lin et al. | |
| 8,363,984 B1 * | 1/2013 | Goldman | 382/298 |
| 2010/0073402 A1 | 3/2010 | Delia et al. | |
| 2010/0199227 A1 * | 8/2010 | Xiao et al. | 715/863 |
| 2010/0226564 A1 * | 9/2010 | Marchesotti et al. | 382/159 |
| 2011/0255589 A1 * | 10/2011 | Saunders et al. | 375/240.01 |

FOREIGN PATENT DOCUMENTS

WO  2010131167 A1  11/2010

OTHER PUBLICATIONS

Ye Luo; Junsong Yuan; Ping Xue; Qi Tian, "Salient region detection and its application to video retargeting," Multimedia and Expo (ICME), 2011 IEEE International Conference on , vol., No., pp. 1,6, Jul. 11-15, 2011.*
Zhang, M. et al.; "Auto Cropping for Digital Photographs"; Jul. 6-8, 2005; http://citeseerxist.psu.edu/viewdoc/download?doi=10.1.1.63.5876&rep=rep1&type=pdf.
Luo, J.; "Subject Content-based Intelligent Cropping of Digital Photos"; Jul. 2-5, 2007; pp. 2218-2221; http://ieeexplore.ieee.org//xpls/abs_all.jsp?arnumber=4285126.

* cited by examiner

*Primary Examiner* — Nirav G Patel (57) ABSTRACT

A method for auto-cropping includes, creating a saliency map corresponding to a digital image, the saliency map indicating a relevance of pixels within the digital image with saliency values within a number range, a lower end of the number range being less than zero and an upper end of the number range being greater than zero. The method further includes, analyzing the saliency map to find a potential cropping rectangle, the potential cropping rectangle having a maximum sum of saliency values within borders of the rectangle.

19 Claims, 10 Drawing Sheets

Fig. 1

Original Image
(200)

Fig. 2A

Cropped Image
(210)

Fig. 2B

Original Image
(300)

*Fig. 3A*

Saliency Map
(300)

Color Patch
(500)

*Fig. 5A*

Saliency
Determination
(510)

With a physical computing system, create a saliency map corresponding to a digital image, the saliency map indicating a relevance of pixels within the digital image with saliency values within a number range, a lower end of the number range being less than zero and an upper end of the number range being greater than zero
(block 1002)

With the physical computing system, analyze the saliency map to find a potential cropping rectangle, the potential cropping rectangle having a maximum sum of saliency values within borders of the rectangle
(block 1004)

*Fig. 10*

AUTO-CROPPING IMAGES USING SALIENCY MAPS

BACKGROUND

Digital photos often undergo a process referred to as cropping. Cropping is the process of cutting a smaller photo out of a larger photo. Typically, a smaller rectangle is formed around an object of relevance. This rectangle then becomes the outer borders of a new photo, often referred to as the cropped image. Various machine readable instructions that allow users to view, edit, and manage photo files include such a cropping feature.

Photos may be cropped for a variety of reasons. It may be the case that a user wishes to remove various objects from an image. Thus, a new image is formed that focuses on the desired objects while removing the undesired objects. In some cases, a photo may have to have a particular size or aspect ratio. For example, if the user is creating a photo album, there may be spaces designed for photos of a specific size. Thus, the user crops various images to fit within those spaces.

BRIEF DESCRIPTION OF THE DRAWINGS

The accompanying drawings illustrate various examples of the principles described herein and are a part of the specification. The drawings are merely examples and do not limit the scope of the claims.

Throughout the drawings, identical reference numbers designate similar, but not necessarily identical, elements.

DETAILED DESCRIPTION

As mentioned above, many machine readable instructions that allow users to view, edit, and manage photo collections provide a cropping feature. In some cases, it may be helpful to a user to have a feature that suggests potential rectangles for cropped image. Such a feature is difficult to create due to the variety of aesthetic, spatial, and artistic factors that are typically involved in the decision of how to crop an image.

In light of this and other issues, the present specification discloses methods and systems for auto-cropping. Auto-cropping refers to the process of analyzing an image and suggesting a potential rectangle as the borders for the new cropped image. Methods described herein are designed to be aware of the content of the photo and other factors which typically affect the decision of how to crop an image.

According to certain illustrative examples, to determine a potential cropping boundary, a saliency detection function is first applied to an image to create a saliency map. Saliency of a pixel depends on how much that pixel differs from other pixels. Saliency generally corresponds to relevancy of a pixel. The saliency map defines the saliency of each pixel with a saliency value. Various factors which determine the saliency of each pixel are described in more detail below. In one example, the saliency function can assign a saliency value to each pixel ranging between 0 and 1. A rating of 0 indicates a completely irrelevant pixel and a rating of 1 indicates an absolutely relevant pixel.

To determine a rectangle for a potential cropped image boundary, a function is applied to analyze a number of possible rectangles within the image. When considering a particular rectangle, the sum of each pixel saliency value determines the score of that rectangle. The rectangle with the highest score is suggested to the user as a potential image cropping boundary. Various functions may be designed that efficiently find the rectangle with the highest score without having to calculate the sum for each possible rectangle within the image.

With saliency values ranging between 0 and 1, the rectangle with the largest sum is the same as the borders of the pre-cropped image. Thus, the pixel saliency values are shifted down by a value of T. For example, if T is 0.3, then the new saliency value range is between 0.3 and 0.7, with −0.3 being a completely irrelevant pixel and 0.7 being an absolutely relevant pixel. As some of the saliency values are now negative, the sum of each pixel within a rectangle can potentially be negative. Thus, the rectangle with the maximum sum of saliency values focuses on the more relevant pixels within the image. The aggressiveness of the image crop, which refers to how closely the relevant objects are cropped, can be adjusted by changing the value of T.

Through use of methods and systems embodying principles described herein, an effective manner of auto-cropping is realized. The auto-cropping function may also be configurable based on a user's preferences. For example, the user may set various constraints such as a fixed aspect ratio or a fixed size. Thus, based on the user's setting the user is provided with automatic cropping rectangles without having to manually draw a rectangle around desired objects.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Figure 1:
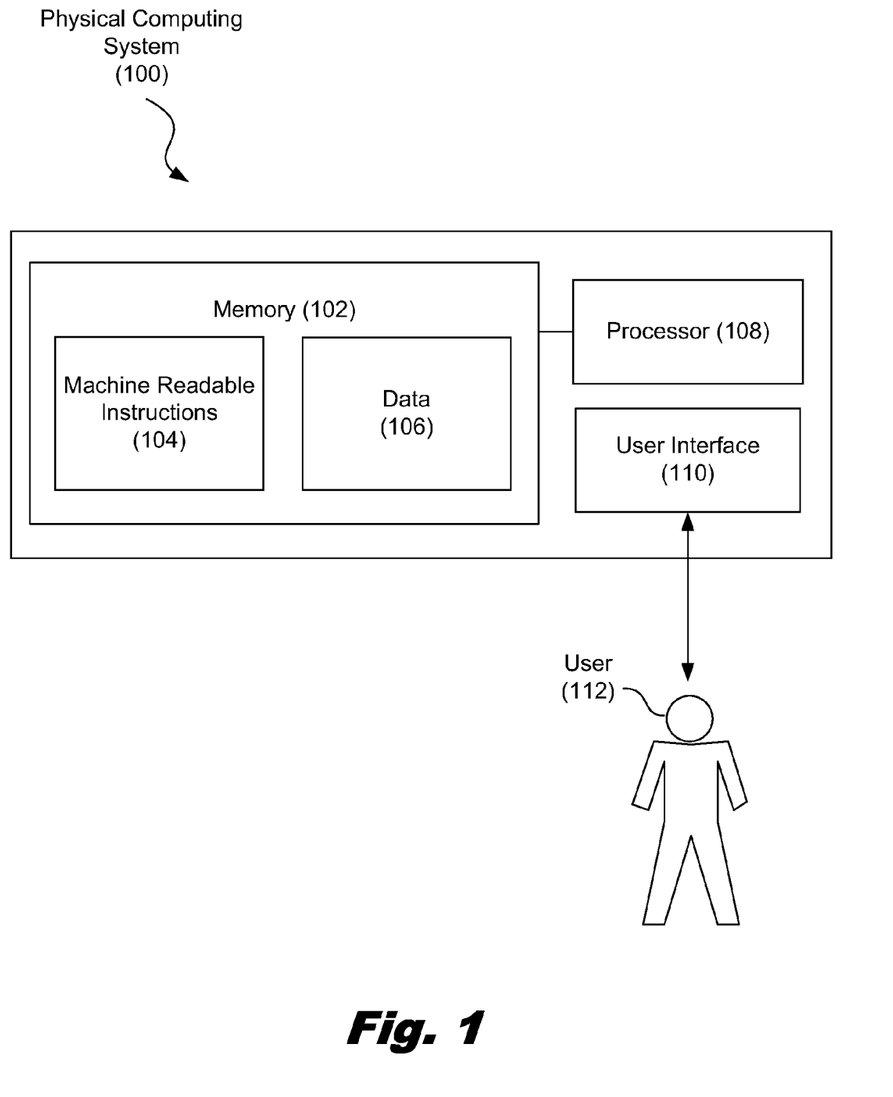
FIG. 1 is a diagram showing an illustrative physical computing system, according to one example of principles described herein.

Referring now to the figures, FIG. 1 is a diagram showing an illustrative physical computing system (100) to be used for decision support. According to certain illustrative examples, the physical computing system (100) includes a memory (102) having machine readable instructions (104) and data (106) stored thereon. The physical computing system (100) also includes a processor (108) and a user interface (110).

There are many types of memory available. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various forms of memory may store information in the form of machine readable instructions (104) and data (106).

The physical computing system (100) also includes a processor (108) for executing the machine readable instructions (104) and using or updating the data (106) stored in memory (102). The machine readable instructions (104) may include an operating system. An operating system allows other applications to interact properly with the hardware of the physical computing system. Such other applications may include a photo management application that allows a user to view, edit, and manage photos within a collection. Such an application may embody principles described herein related to auto-cropping.

A user interface (110) may provide a means for the user (112) to interact with the physical computing system (100). The user interface may include any collection of devices for interfacing with a human user (112). For example, the user interface (110) may include an input device such as a keyboard or mouse and an output device such as a monitor.

Figure 2A:
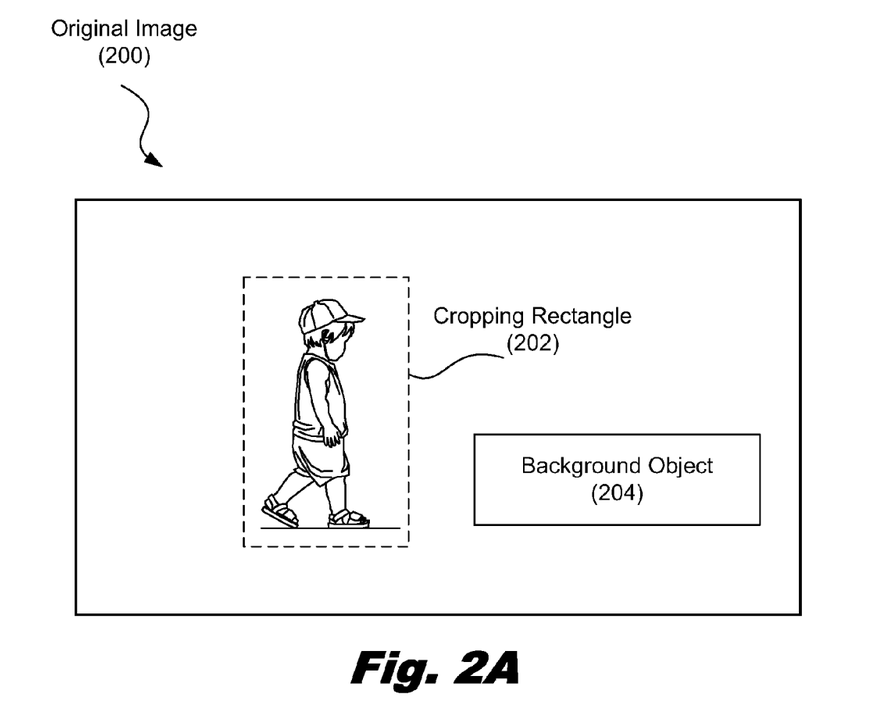
FIG. 2A is a diagram showing an illustrative original image before cropping, according to one example of principles described herein.
Figure 2B:
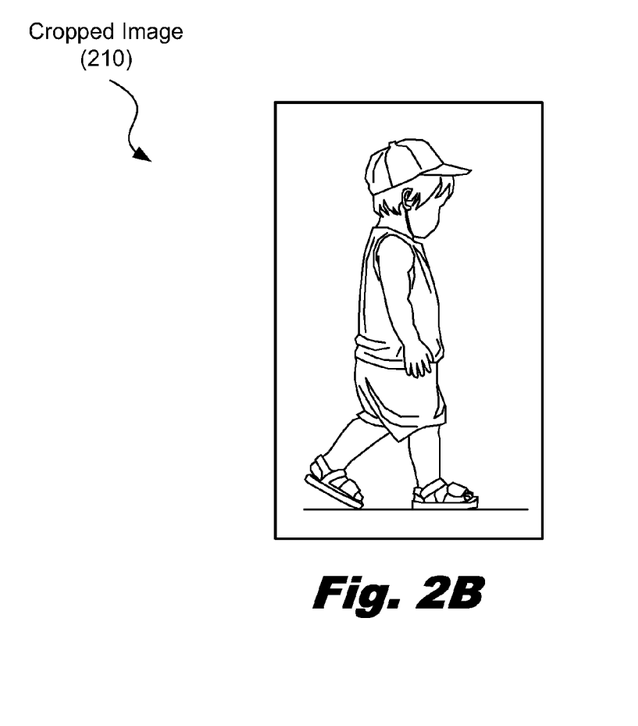
FIG. 2B is a diagram showing an illustrative cropped image, according to one example of principles described herein.

FIG. 2A is a diagram showing an illustrative original image (200) before being cropped. To illustrate the principle of cropping, a potential cropping rectangle (202) is shown around an object deemed to be relevant. The cropping rectangle (202) excludes various background objects (204) which may be of disinterest to a user. FIG. 2B is a diagram showing an illustrative cropped image (210). As can be seen from the illustration, the borders of the cropped image correspond to the cropping rectangle (202) of FIG. 2A.

Figure 3A:
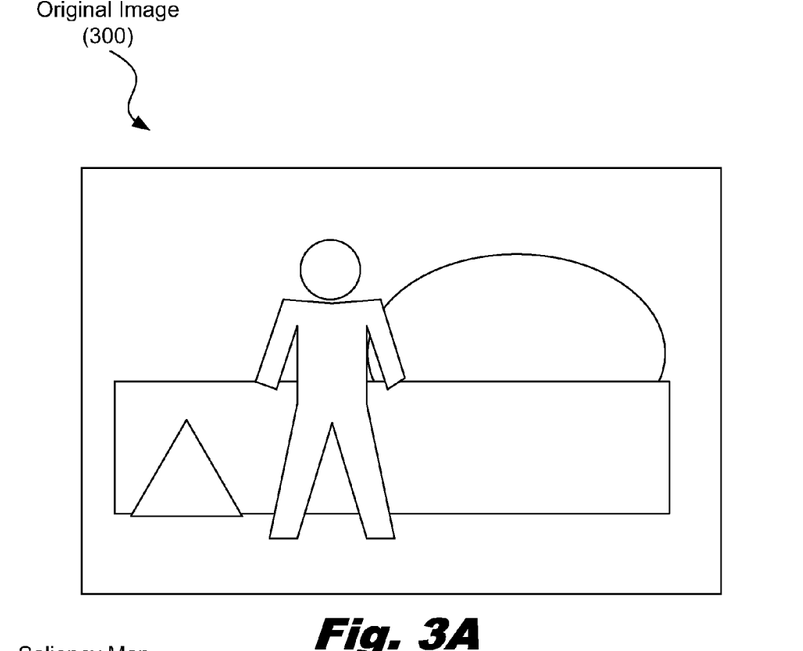
FIGS. 3A-3B are diagrams showing the process of creating a saliency map from an original image, according to one example of principles described herein.
Figure 3B:
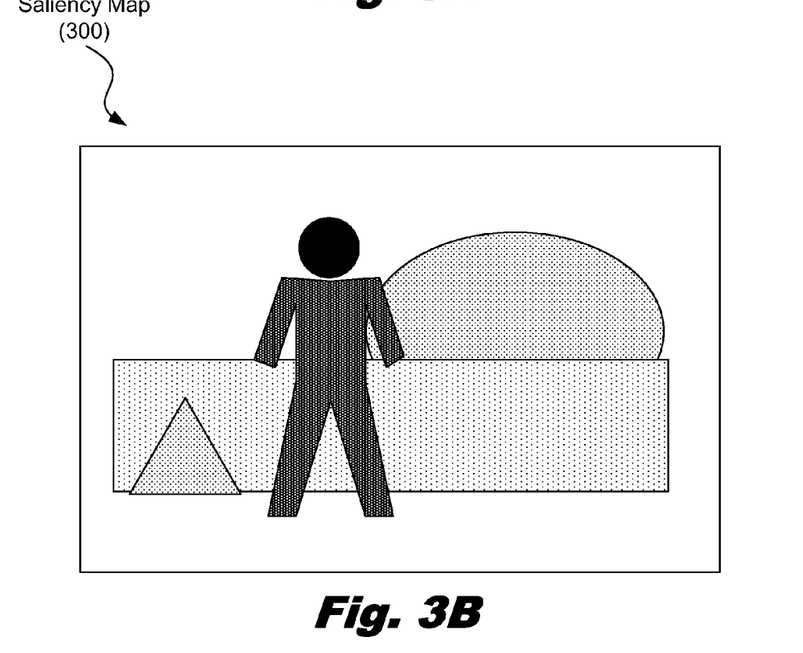

FIGS. 3A-3B are diagrams showing the process of creating a saliency map from an original image. As mentioned above, a saliency map defines a saliency value for each pixel within the image. The saliency value, after being shifted, may range from a negative value to a positive value. The saliency values define the relevancy of each pixel. The image of FIG. 3A is merely an illustrative depiction. The saliency map creation process typically is performed on full color images.

FIG. 3B is a diagram showing an illustrative visual representation of a saliency map. A visual representation of a saliency map may be a grayscale image wherein the range of gray color corresponds to the range of saliency values. In one example, a saliency map can be represented visually. In this case, the saliency map is represented such that darker shades represent pixels that have been given greater saliency values and lighter shades represent pixels that have been given smaller saliency values. Determination of saliency values for each pixel is described in greater detail below.

Figure 4:
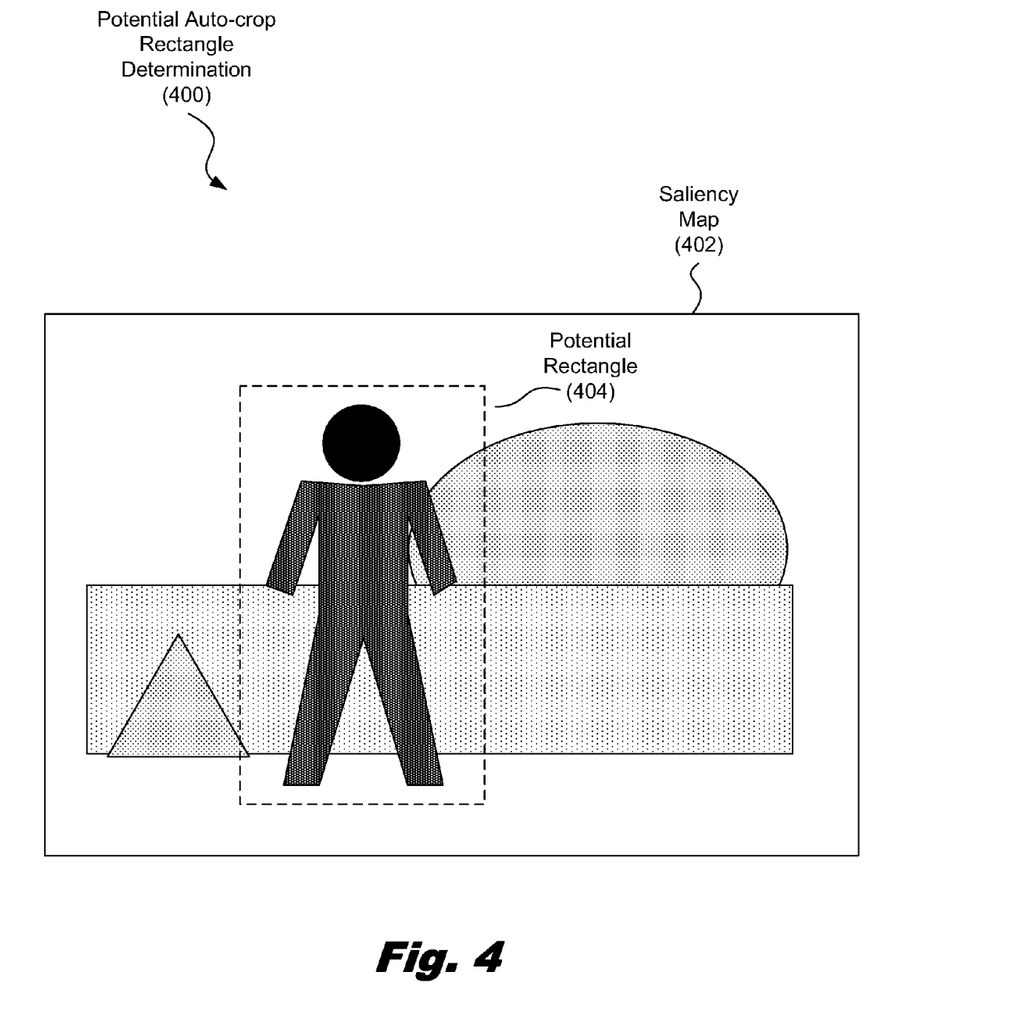
FIG. 4 is a diagram showing an illustrative process of potential auto-crop rectangle determination, according to one example of principles described herein.

FIG. 4 is a diagram showing an illustrative process of potential auto-crop rectangle determination (400). According to certain illustrative examples, after the saliency map has been created, a rectangle determination function is applied to find the rectangle that has, within its borders, the greatest sum of saliency values. In general, a rectangle determination function that adds pixel values for each possible rectangle within the image may be too processor intensive and take too much time. Thus, various functions can be used to simplify the process. An example of such a function is described in more detail below in the text accompanying FIGS. 8-9.

As mentioned above, the pixels on the low end of the saliency value range has negative saliency values. Thus, the sum of pixel values within a given rectangle likely has both positive and negative values. Thus, the rectangle having the greatest sum of saliency values within its borders likely includes the pixels with the highest saliency values in order to offset the various negative values which likely are within the rectangle. This rectangle may then be presented to the user as a potential rectangle (404) for cropping purposes. In some cases, the photo management application that includes the auto-cropping feature may execute the crop using the potential rectangle (404) without waiting for user approval.

The rectangle with the largest sum of saliency values should include the most desired objects within the original image. These desired objects vary depending on the type of photograph. As the rectangle selection process relies on the saliency values defined within the saliency map, the manner in which the saliency map is created and the pixels which are assigned greater saliency values have a large effect on the potential rectangle (404) selected by the rectangle detection function. The following provides more detail on various features of the saliency creation function which may be utilized by methods and systems embodying principles described herein.

In some cases, the rectangle determination process is subject to constraints. For example, a user may wish to have a cropped image with a specific aspect ratio. Alternatively, a user may wish to have a cropped image of a specific size. A user may also wish to have a range of sizes. In such cases, the user may specify such constraints for the rectangle determination process. During the rectangle search process, the process of finding the sum of saliency values for pixels within a rectangle's borders are performed on rectangles meeting such constraints.

Figure 5A:
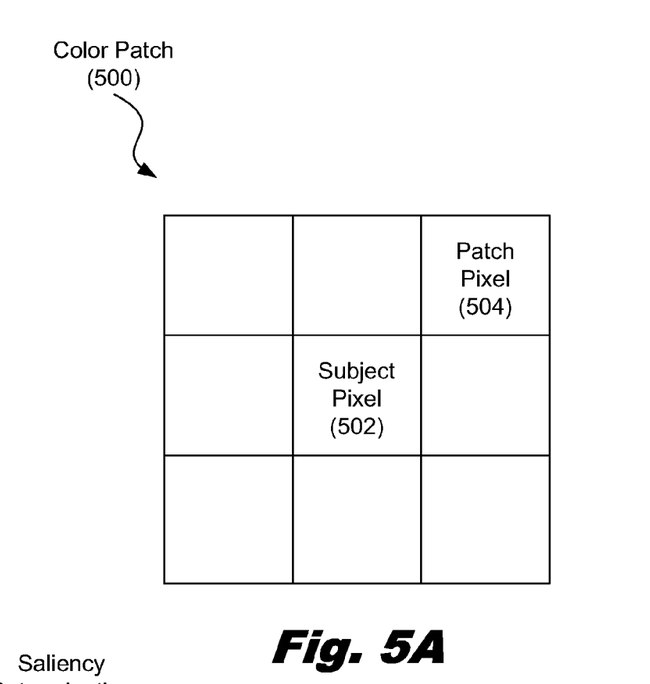
FIG. 5A is a diagram showing an illustrative color patch, according to one example of principles described herein.

FIG. 5A is a diagram showing an illustrative color patch (500). According to certain illustrative examples, for purposes of determining saliency, each pixel is described in a particular way. Each pixel is described by its own colors as well as the colors of pixels nearby. The set of pixels near a particular pixel is referred to as a color patch. The pixel being considered or described is referred to as the subject pixel (502).

The color of a pixel is typically represented using a Red, Green, and Blue (RGB) color scheme. The RGB color scheme uses the three primary colors of red, green, and blue to represent several different colors. By varying the intensity of the primary colors, a range of colors can be displayed for a particular pixel. The intensity of each primary color is often represented digitally. For example, the intensity for each primary color may be represented with an 8 bit value. In such a case, the pixel intensity may take one of 256 different levels.

Other color models for representing pixels also are applicable, including a CMYK (cyan, magenta, yellow, and key (black)) color model that uses secondary colors.

In some cases, the color of a pixel is represented using the Lab color space. The Lab color space defines colors using different dimensions. Particularly, the Lab color space represents colors using three dimensions: L for lightness, and a and b, where a and b are color-opponent dimensions based on the non-linearly compressed International Commission on Illumination (CIE) XYZ color space coordinates. Various functions can be used to convert color representations between the RGB color representation and the Lab color representation. One reason for using a Lab representation for pixels is that it is perceptually uniform.

According to certain illustrative examples, the subject pixel descriptor can be represented by six different values. For each primary color, there is a mean and a standard deviation of the color values for the pixels within the color patch associated with the subject pixel. For example, if the color patch is a 3×3 patch with the subject pixel being the center of the patch, then the mean value for the red color of each of the nine patch pixels (504), which includes the subject pixel (502) are used to determined. Additionally, the standard deviation of the set of red values for the patch pixels is determined. Using both the standard deviation and mean values from the set of red, green, and blue color values, the description of the subject pixel (502) is sufficiently and succinctly described in a manner that is useful to saliency detection. By representing the standard deviation and mean values instead of the entire set of data, less space is taken up and fewer calculations are performed. Additionally, such representation is more noise robust.

A subject pixel may also be described on multiple scales. Particularly, the subject pixel may be represented using varying sized color patches of 5×5, 9×9, etc. These varying scales may be factored into the saliency analysis and determination. Various functions may be used that effectively process the data on multiple scales in an efficient manner.

Figure 5B:
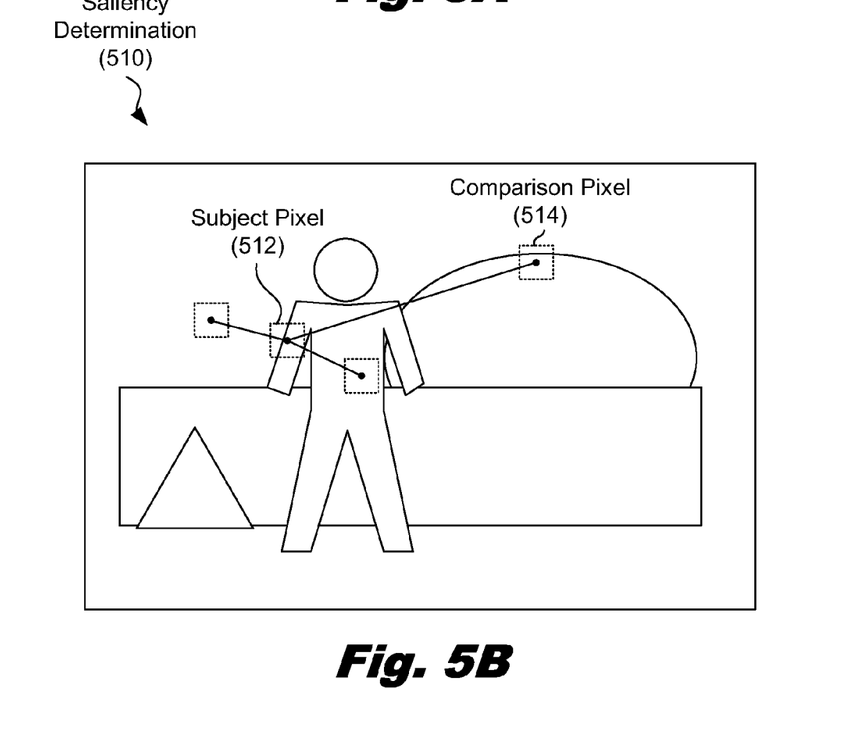
FIG. 5B is a diagram showing an illustrative process of saliency determination, according to one example of principles described herein.

FIG. 5B is a diagram showing an illustrative process of saliency determination. According to certain illustrative examples, using the description of a pixel as described above, the saliency of a pixel is determined by comparing it to the description of pixels both nearby and farther away. The more a pixel's description differs from the description of the pixels around it, the more likely it is to be assigned a greater saliency value.

The pixels with which the subject pixel (512) is compared with are referred to as comparison pixels (514). The subject pixel (512) are compared with comparison pixels at varying distances and directions from the subject pixel (514). The overall saliency value assigned to the subject pixel are based on how different the description of the subject pixel (502) is in comparison with the description of each of the comparison pixels.

In some cases, the comparisons of comparison pixels are weighted according to distance from the subject pixel (512). Specifically, a strong difference in description values between the subject pixel (512) and a nearby comparison pixel (514) are more strongly affect the saliency value assigned to the subject pixel (512) than a strong difference between the subject pixel and a far away comparison pixel (514). In some cases, the manner in which a comparison is weighted according to distance can be defined by a Gaussian decay function. The Gaussian decay function makes it so that the comparisons from nearby pixels are weighted exponentially greater than the comparisons from far away pixels.

After an initial saliency value has been assigned to each pixel within an image based on the comparison of other pixels, various other factors can be considered to adjust the saliency values. For example, various noise removal functions can be used to remove random small patches of salient pixels. Such small pixels are unlikely to represent relevant objects. A variety of other adjustments may be made as well.

Figure 6A:
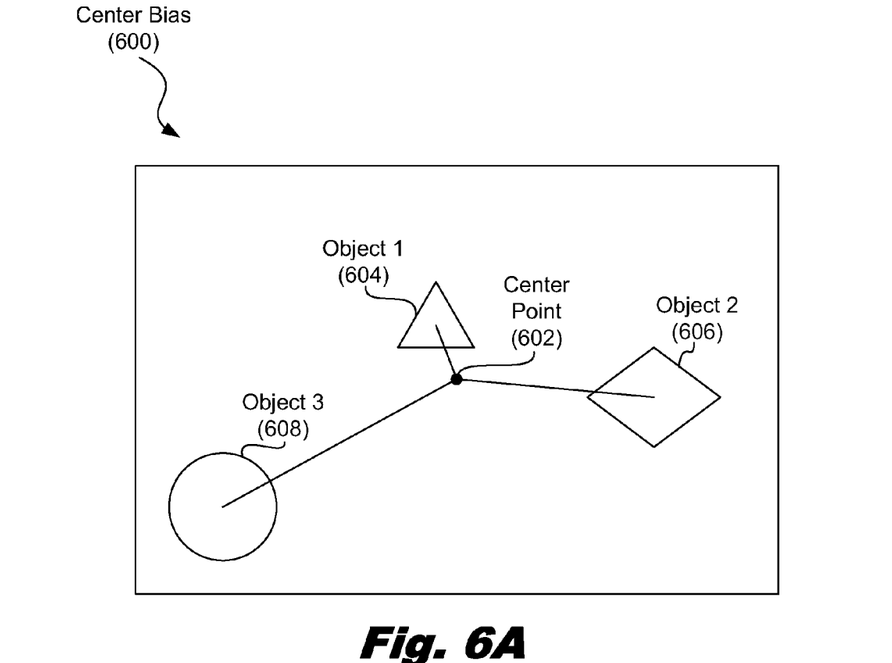
FIG. 6A is a diagram showing an illustrative saliency adjustment process using center bias, according to one example of principles described herein.

FIG. 6A is a diagram showing an illustrative saliency adjustment process using center bias (600). According to certain illustrative examples, the saliency value assigned to each pixel within the saliency map can be adjusted so that pixels within the center are given a slightly higher value and pixels far away from the center are given a slightly lower value. This takes into account that in many cases, the subject of a photograph is positioned within the center of that photograph.

In the example shown in FIG. 6A, Object 1 (604) is closest to the center and thus the saliency values of the pixels associated with Object 1 are raised more than the pixels associated with the other objects (606, 608). Conversely, Object 3 (608) is farthest away from the center point (602) and thus the saliency values of its pixels may be changed very little if at all. In some cases, the saliency values of pixels far away from the center point may be reduced. Object 2 (606) falls within an intermediate distance from the center point and thus are adjusted less high than Object 1 (606) but more high than object 3 (608).

Figure 6B:
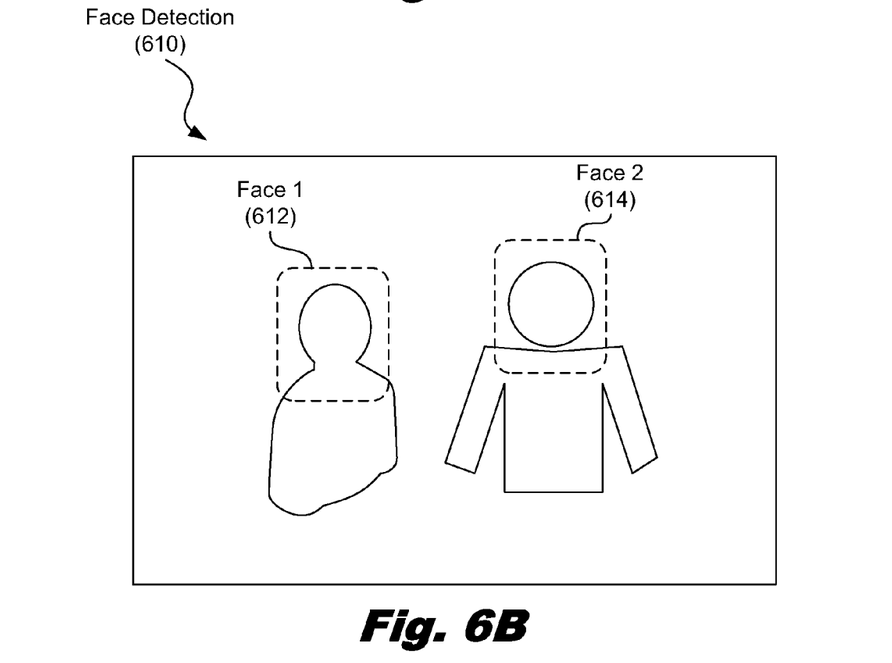
FIG. 6B is a diagram showing an illustrative saliency adjustment process using face detection, according to one example of principles described herein.

FIG. 6B is a diagram showing an illustrative saliency adjustment process using face detection (610). According to certain illustrative examples, the pixels corresponding to faces of people within a photograph can be assigned higher saliency values. A face within the photograph can be determined through use of various face detection functions.

For example, a face detection function may detect a number of faces (612, 614) within a photograph. The pixels associated with those faces may have been assigned various levels of saliency values throughout the saliency determination process and other readjustment processes. The pixels associated with the faces may all be raised by a certain amount so that they have a greater saliency. In some cases, the saliency value of each pixel associated with a face may be raised by a set value. For example, the saliency values may each be raised by a value of 0.2. In some cases, the saliency values of each pixel associated with a face may be raised to a set value if the saliency value is already below that set value. For example, the saliency value of each pixel may be raised to 0.5 if it is not already greater or equal to that value.

Figure 7A:
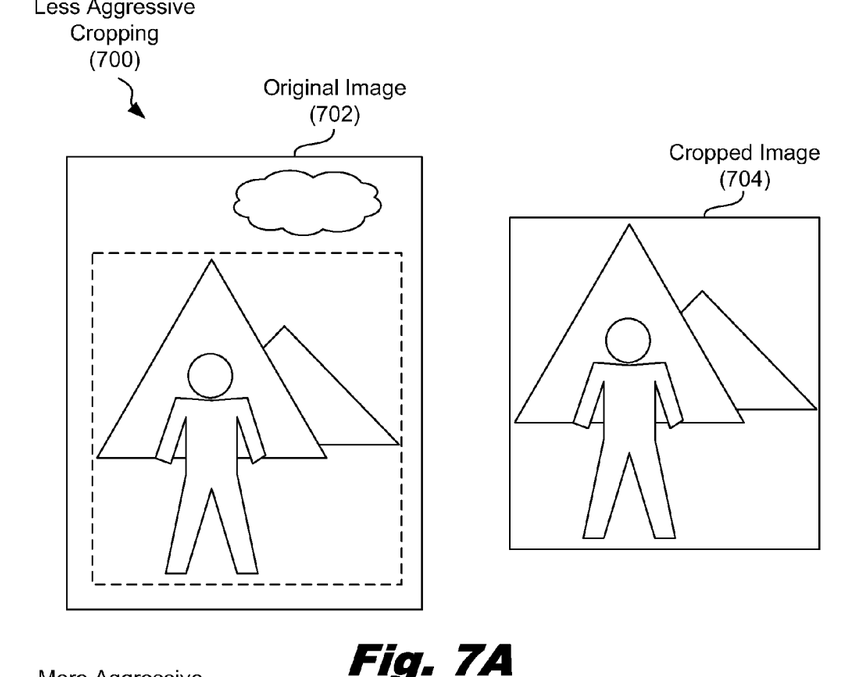
FIG. 7A is a diagram showing an illustrative less aggressive auto-cropping process, according to one example of principles described herein.

FIG. 7A is a diagram showing an illustrative less aggressive auto-cropping process (700). As mentioned above, instead of using a saliency value range that is entirely positive, a saliency value range that has a negative number on the low end and a positive number on the high end is used. However, the portion of the range which is less than zero compared to the portion of the range that is greater than zero affects the aggressiveness of the rectangle determination process. For example, a saliency values range between −0.1 and 0.9 result in a relatively less aggressive cropping when compared to a saliency value range between −0.4 and 0.6.

FIG. 7A illustrates a cropping function with a saliency range where the portion of the range that is greater than zero is relatively large compared to the portion of the range that is less than zero. In this case, a larger rectangle within the original image (702) is used as the borders for the new cropped image (704). As fewer of the pixels have negative saliency values, the rectangle with the largest sum of saliency values within its borders is a relatively large rectangle.

Figure 7B:
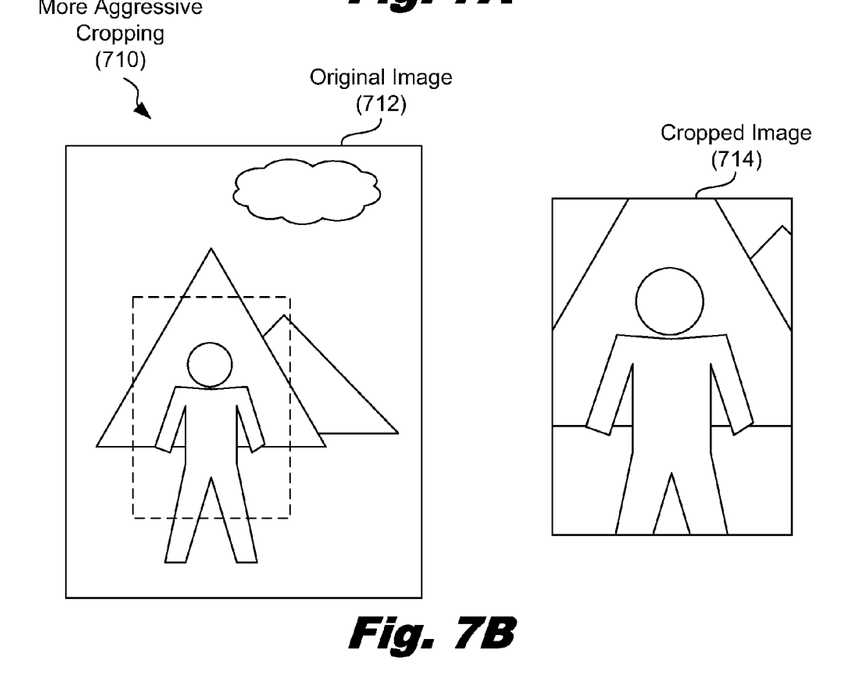
FIG. 7B is a diagram showing an illustrative more aggressive auto-cropping process, according to one example of principles described herein.

FIG. 7B is a diagram showing an illustrative more aggressive auto-cropping process (710). FIG. 7B illustrates a cropping function with a saliency value range where the ratio between the portion of the range that is greater than zero and the portion that is less than zero is smaller. In this case, more pixels have negative saliency values. As a result, the rectangle within the original image (712) having the largest sum of saliency values within its borders is relatively small. However, it does focus on the relevant subject of the photograph. The cropped image (714) thus cuts out more of the background.

Figure 8:
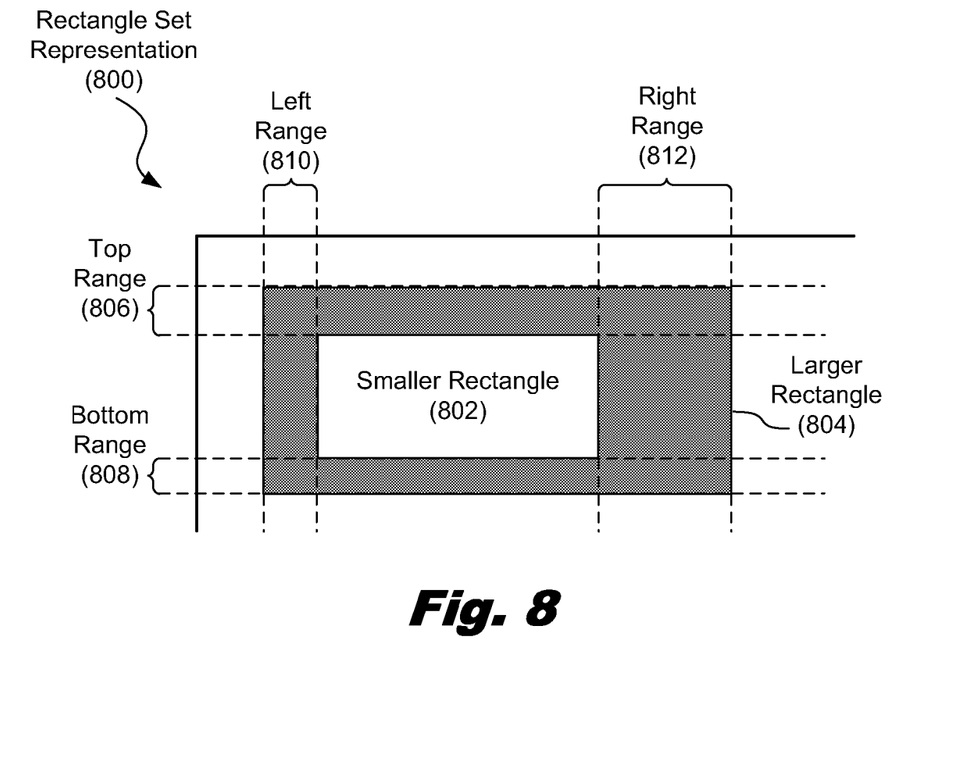
FIG. 8 is a diagram showing illustrative rectangle set representation, according to one example of principles described herein.

FIG. 8 is a diagram showing illustrative rectangle set representation. As mentioned above, various functions may be used to efficiently determine the rectangle within a saliency map that includes the largest sum of saliency values within its borders. According to certain illustrative examples, such a function may operate on sets of rectangles rather than single rectangles. The following describes how such a function may efficiently represent sets of rectangles.

A set of rectangles may be represented by all rectangles ranging between a smaller rectangle (802) and a larger rectangle (804). The individual rectangles may be defined by the edges. For example, coordinates along a horizontal axis may identify the positions of both the left edge and the right edge. Additionally, coordinates along a vertical axis may represent the positions of both the top edge and the bottom edge. The set of rectangles can be defined as a range of coordinates for each edge. For example, the range between the left edge of the smaller rectangle (802) and the larger rectangle (804) are defined as the left range (810). Likewise, the range between the two right edges is referred to as the right range (812). Additionally, the range between the top edges is referred to as the top range (806) and the range between the bottom edges is referred to as the bottom range (808).

By representing sets of rectangles as such, the sets can be efficiently searched for the rectangle within a set that has the maximum sum of saliency values within its borders. As is described in more detail below, a function that efficiently finds the rectangle with the maximum sum of saliency values within its borders may use the upper bound sum of a rectangle within the set of rectangles without knowing exactly which rectangle exhibits that upper bound sum. This upper bound sum can be determined by adding all of the positive saliency values within the larger rectangle (804) and adding all the negative values within the smaller rectangle (802). Although this value defines the upper bound sum of a rectangle within the set, it does not define which rectangle has that upper bound sum.

Figure 9:
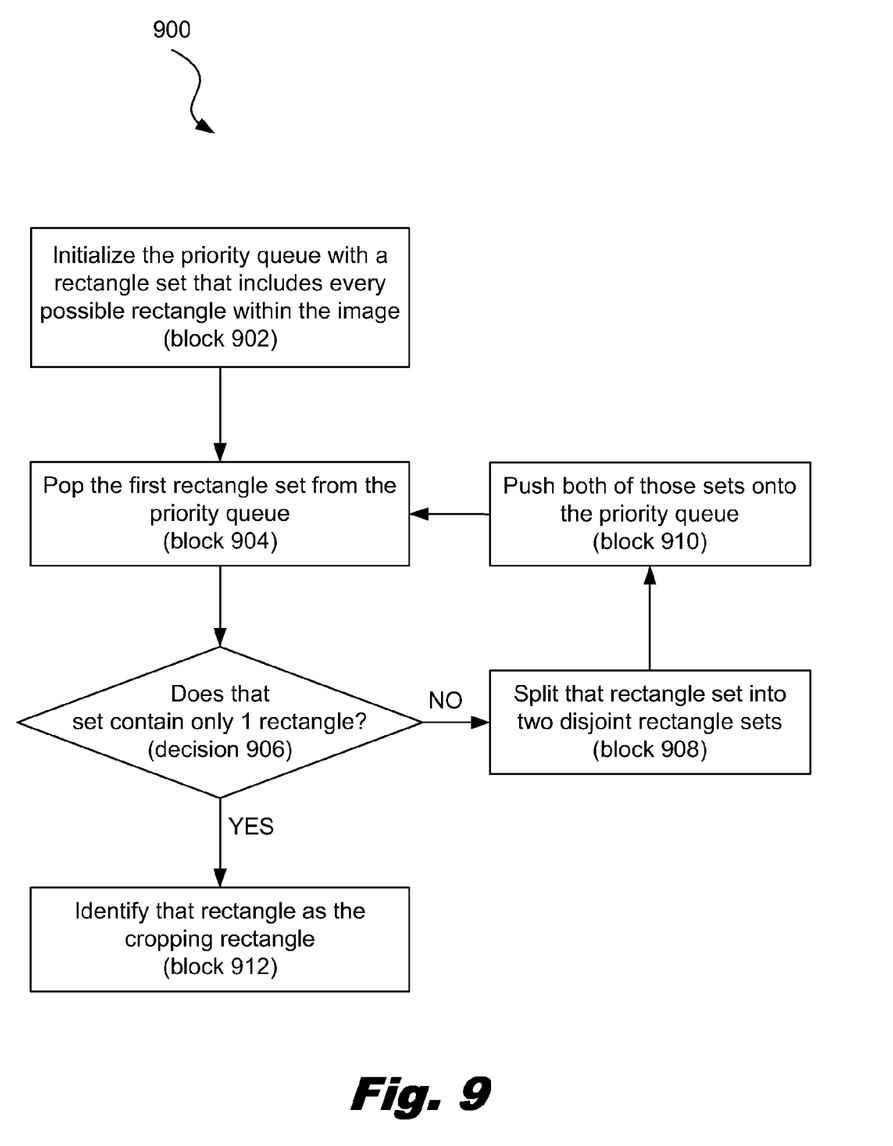
FIG. 9 is a flowchart showing an illustrative method for finding a rectangle with the maximum sum of saliency values within its borders, according to one example of principles described herein.

FIG. 9 is a flowchart showing an illustrative method (900) for finding a rectangle with the maximum sum of saliency values within its borders. According to certain illustrative examples, such a function may utilize a priority queue. A priority queue is one which automatically sorts itself based on a particular criterion. If a new element enters the queue, that element is placed in its appropriate spot within the queue. In this case, each element within the queue is a set of rectangles that is represented as described above. The queue is sorted based on the maximum sum of a rectangle within each set. The set of rectangles having the highest score is placed at the top of the queue.

The queue is first initialized (902) with one set of rectangles. This initial set is a representation of rectangles that includes every possible rectangle within the saliency map. The first rectangle set is then popped (block 904) from the top of the queue. In this case, as there is one rectangle set in the queue, that sole set is placed first and removed.

It is then determined (decision 906) whether there is only one rectangle in the set pulled from the top of the priority queue. It is likely several iterations before this event occurs. If there is more than one rectangle in the set (decision 906, NO), then that set is split (block 908) into two disjoint rectangle sets. Two sets of rectangles are disjoint if no rectangle within one set exists within the other set. In one example, a set may be split into disjoint sets may dividing the range of an edge in half.

Both of the recently split rectangle sets are then pushed (block 910) onto the priority queue. The priority queue is then sorted so that the rectangle set having a rectangle with the highest sum of saliency values within its borders is on top. In order to determine the maximum sum of the saliency values within borders of rectangles within the set, the process described above may be used.

If it is determined (decision 906, YES) that the set recently popped from the priority queue contains only one rectangle, then it can be determined that that rectangle has the maximum sum of saliency values within its borders. This rectangle can then be used as the borders for the cropped image. By analyzing the rectangles within an image in such a manner, fewer calculations are performed as subsets of rectangles having lower maximum scores are never evaluated.

Figure 10:
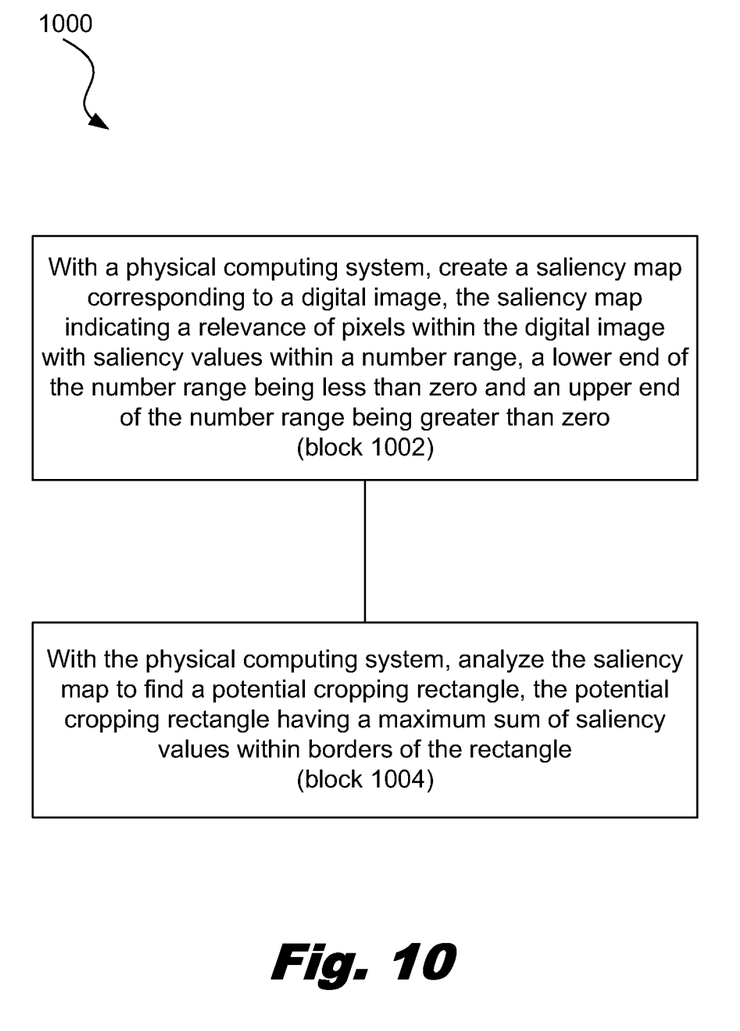
FIG. 10 is a flowchart showing an illustrative method for auto-cropping, according to one example of principles described herein.

FIG. 10 is a flowchart showing an illustrative method (1000) for auto-cropping. According to certain illustrative examples, the method includes, with a physical computing system, creating (block 1002) a saliency map corresponding to a digital image, the saliency map indicating a relevance of pixels within the digital image with saliency values within a number range, a lower end of the number range being less than zero and an upper end of the number range being greater than zero. The method further includes, with the physical computing system, analyzing (block 1004) the saliency map to find a potential cropping rectangle, the potential cropping rectangle having a maximum sum of saliency values within borders of the rectangle.

Through use of methods and systems embodying principles described herein, an effective manner of auto-cropping is realized. The auto-cropping function may also be configurable based on a user's preferences. For example, the user may set various constraints such as a fixed aspect ratio or a fixed size. Thus, based on the user's setting the user is provided with automatic cropping rectangles without having to manually draw a rectangle around desired objects.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for auto-cropping, the method comprising:
   with a physical computing system, creating a saliency map corresponding to a digital image, said saliency map indicating a relevance of pixels within said digital image with saliency values within a number range, a lower end of said number range being less than zero and an upper end of said number range being greater than zero;
   with said physical computing system, analyzing said saliency map to find a potential cropping rectangle, said potential cropping rectangle having a maximum sum of saliency values within borders of said rectangle,
   wherein saliency values of said saliency map associated with pixels of a detected face within said digital image are raised.

2. The method of claim 1, wherein creating said saliency map comprises use of descriptor values assigned to pixels within said digital image, said descriptor values representing a pixel as a mean and a standard deviation of colors within a color patch associated with said pixel.

3. The method of claim 2, wherein said descriptor values use color patches of multiple scales.

4. The method of claim 1, further comprising, adjusting said saliency map such that regions smaller than a predefined area with high saliency values are removed.

5. The method of claim 1, wherein said saliency map is adjusted so that saliency values towards a center point within said saliency map are raised in comparison to saliency values away from said center point.

6. The method of claim 1, further comprising, shifting all of said saliency values to change an aggressiveness of said potential cropping rectangle.

7. The method of claim 1, wherein said rectangle is subject to at least one of: a fixed aspect ratio constraint, an aspect ratio range constraint, a fixed size constraint, and a size range constraint.

8. The method of claim 1, wherein analyzing said saliency map to find a potential cropping rectangle comprises;
representing subsets of rectangles in sets;
determining an upper bound sum of a rectangle within each of said sets;
placing said sets into a priority queue;
splitting a popped set from said priority queue into disjoint sets if said popped set includes more than one rectangle; and
identifying a rectangle from said popped set as said potential cropping rectangle if said set contains only one rectangle.

9. The method of claim 8, wherein determining said upper bound sum of a rectangle within a set comprises adding all positive saliency values within borders of the largest rectangle of said set with all the negative values within borders of the smallest rectangle within said set.

10. The method of claim 1, further comprising receiving a number of user defined constraints, the user defined constraints comprising constraints on aspect ratio of a potential cropped portion of the image, constraints on the size of a potential cropped portion of the image, or combinations thereof.

11. The method of claim 1, in which raising saliency values of said saliency map associated with pixels of a detected face within said digital image comprises raising the saliency values of said saliency map associated with pixels of a detected face by a set value.

12. A computing system comprising:
at least one processor;
a memory communicatively coupled to the at least one processor, the memory comprising computer executable code that, when executed by the at least one processor, causes the at least one processor to:
create a saliency map associated with a digital image, said saliency map indicating a relevance of pixels within said digital image with saliency values within a number range, a lower end of said number range being less than zero and an upper end of said number range being greater than zero;
analyze said saliency map to find a potential cropping rectangle, said potential cropping rectangle having a maximum sum of saliency values within borders of said rectangle,
wherein said at least one processor is further to adjust said saliency map such that regions smaller than a predefined area with high saliency values are removed.

13. The system of claim 12, wherein to create said saliency map, said at least one processor is further caused to use descriptor values assigned to pixels within said digital image, said descriptor values representing a pixel as a mean and a standard deviation of colors within a color patch associated with said pixel.

14. The system of claim 12, wherein said at least one processor is further to shift all of said saliency values to change an aggressiveness of said potential cropping rectangle.

15. The system of claim 12, further comprising raising saliency values of said saliency map associated with pixels of a detected face within said digital image.

16. A method for auto-cropping, the method comprising:
with a physical computing system, creating a saliency map that corresponds to a digital image, said saliency map defining saliency values within a range for pixels within said digital image;
with said physical computing system, shifting said range so that a low end of said range is less than zero while a high end of said range is greater than zero;
with said physical computing system, adjusting said saliency map such that regions smaller than a predefined area with high saliency values are removed;
with said physical computing system, finding a rectangle within said saliency map that has a maximum sum of saliency values within its borders; and
with said physical computing system, using said rectangle as a potential cropping boundary.

17. The method of claim 16, in which finding a rectangle within said saliency map that has a maximum sum of saliency values within its borders comprises;
representing subsets of rectangles in sets;
determining an upper bound sum of a rectangle within each of said sets;
placing said sets into a priority queue;
splitting a popped set from said priority queue into disjoint sets if said popped set includes more than one rectangle; and
identifying a rectangle from said popped set as said potential cropping rectangle if said set contains only one rectangle.

18. The method of claim 17, in which determining said upper bound sum of a rectangle within a set comprises adding all positive saliency values within borders of the largest rectangle of said set with all the negative values within borders of the smallest rectangle within said set.

19. The method of claim 16, in which said saliency values of said saliency map associated with pixels of a detected face within said digital image are raised.

* * * * *